2,286,713

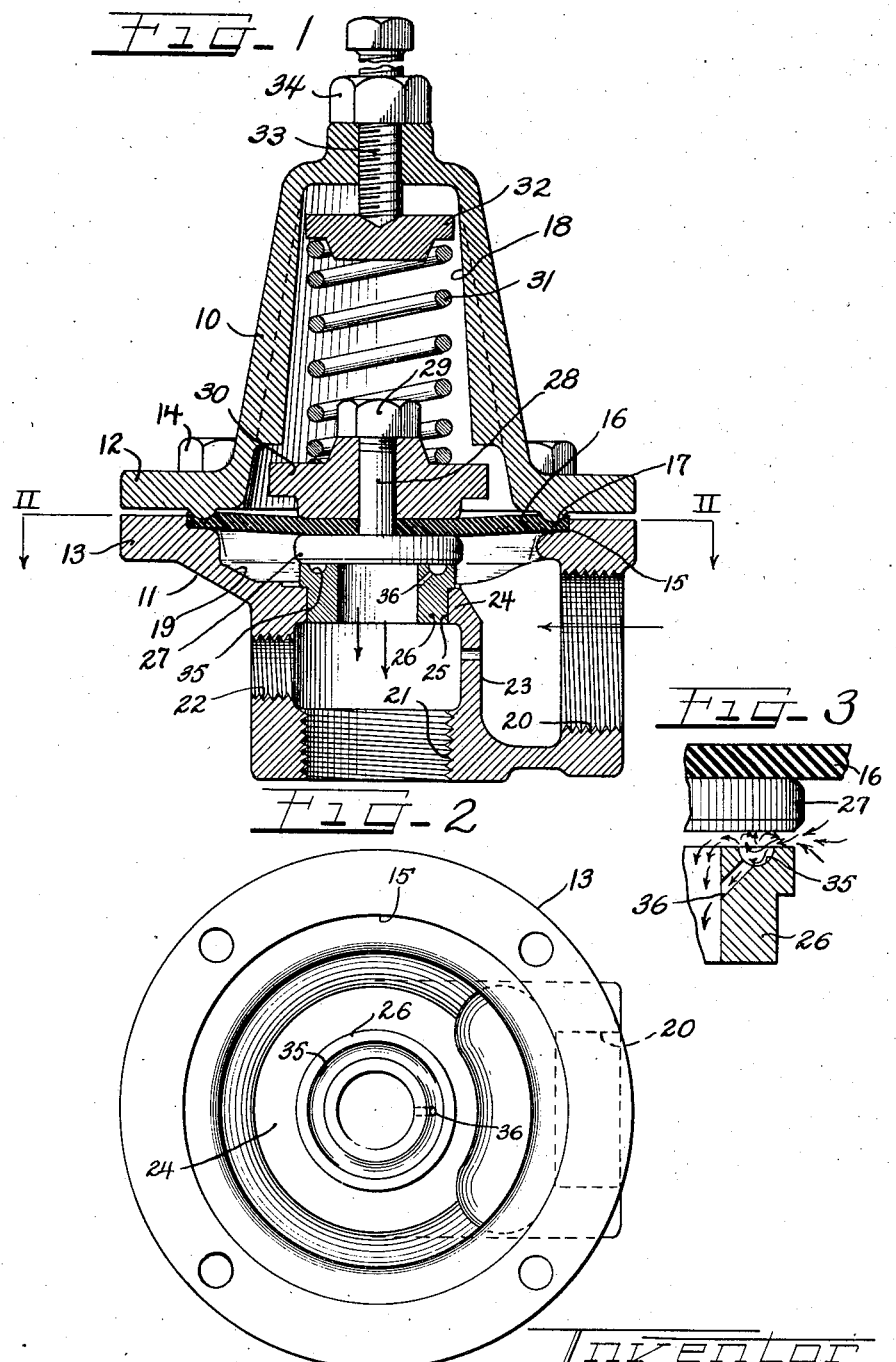
June 16, 1942.  A. W. BURKS  2,286,713
VALVE
Filed Feb. 12, 1940
Inventor
Arthur W. Burks Patented June 16, 1942

UNITED STATES PATENT OFFICE 2,286,713

VALVE

Arthur W. Burks, Decatur, Ill., assignor to Decatur Pump Company, Decatur, Ill., a corporation of Illinois Application February 12, 1940, Serial No. 318,392

5 Claims. (Cl. 137—53)

The present invention relates in general to a valve construction and is more particularly concerned with improvements in valves of the type utilized for the regulation and relief of pressures, especially such of said valves as may utilize a pressure responsive diaphragm in its construction.

Heretofore, valves for such purposes have in the main included a valve member which was normally biased to closed position against a cooperatively associated seat by means of a variably adjustable spring. For actuating the valve member to open position, a suitable diaphragm was utilized, this diaphragm being so arranged as to be responsive to the inlet flow pressure to the valve.

Since the diaphragm in these valves was usually disposed adjacent the valve parts for controlling the flow, there was objectionable chattering of the valve parts instead of positive opening thereof, when the flow pressure reached a value at which the valve was set to open. Such operation was due to there being a slight decrease in the pressure acting on the diaphragm, whenever the valve opened, this decrease in pressure permitting reclosure of the valve parts under the action of the regulating spring and repetition of the opening and closing cycle to cause chattering thereof.

Having in mind this as well as other objections to valves of the foregoing type as now constructed, the present invention contemplates as a primary object an improved valve construction wherein objectionable chattering of the valve parts will be eliminated.

It is a further object of the herein described invention to provide an improved valve construction in which one of the valve parts is provided with a rugose portion which acts upon opening of the valve to deflect a portion of the flow in such a manner as to cause eddy currents, these eddy currents creating forces tending to move the valve parts to open position and thus compensate for decrease of the pressure acting on the valve opening diaphragm, whereby the valve parts will be positively opened and chattering will be eliminated.

It is still another object of the invention to provide an improved non-chattering valve of simple and inexpensive construction, and which is simple in operation and positive in action.

Other objects and features of the invention will more fully appear from the following detailed description taken in connection with the accompanying drawing, which illustrates a single embodiment thereof, and in which:

Figure 1 is a vertical section taken through the valve of the present invention to disclose certain details of its construction and the cooperative relationship of the valve parts;

Figure 2 is a plan view of the lower half of the valve casing with the diaphragm and connected parts removed for showing details of construction of the seating surface of the valve seat, as viewed along and in the direction indicated by lines II—II in Figure 1, and Figure 3 is an enlarged fragmentary view showing the valve parts in open position and the manner in which eddy currents are effected in the flow therebetween.

As shown on the drawing:

For purposes of illustration, I have chosen to illustrate the features of the present invention as being embodied in a valve construction which may be utilized to maintain a limit of pressure in a closed system by automatically allowing the escape of liquid at any time the pressure increases beyond a desired point.

Referring specifically to Figure 1, the valve comprises a split casing consisting of an upper portion 10 and a lower portion 11 which are arranged to be joined together in any suitable manner, but preferably in such a manner as to permit disassembly of the casing parts, when desired.

In the present instance, the casing parts are of generally hollow construction and are provided with securing flanges 12 and 13 which may be removably secured together in spaced relation by means of suitable securing bolts 14 spaced apart around the flanges.

At the innermost edge on the flange 13, there is preferably provided an internal annular groove 15 which is adapted to receive the peripheral edge margin of a flexible diaphragm 16 which may be constructed of any suitable material, rubber having been found satisfactory for such purpose. This diaphragm is maintained clamped against the bottom of the seating groove by means of a cooperatively associated annular bead or ridge 17 formed on the inner face of the securing flange 12. This bead, it will be noted, will press into the peripheral margin of the diaphragm when the casing parts are secured together. Also, the bead 17 cooperates with the groove 15 to properly align the upper part of the casing with the lower part of the casing. The diaphragm 16 separates the valve casing into an upper chamber 18 and a lower chamber 19.

The chamber 19 forms a flow passage which is connected at one end with an inlet 20 and at its other end with one or more outlets 21 and 22.

Between the valve inlet and the valve outlet, there is preferably provided in the chamber a baffle 23 having a horizontally disposed portion 24. The portion 24 is apertured as shown at 25 for receiving therein an annular valve seating member 26, which is thus supported above the outlet 22 in axial alignment with the outlet 21.

Cooperatively associated with the valve seat 26 is a valve assembly comprising a valve disk 27 having an upwardly extending central stem portion 28 which extends through the flexible diaphragm at its center. The stem 28 is threaded at its outermost end for receiving a nut 29 by means of which a spring saddle clamping member 30 may be clampingly secured against the opposite side of the flexible diaphragm from that side engaged by the valve disk 27.

The uppermost surface of the spring saddle 30 is arranged to receive thereover one end of a coiled spring 31 which has its uppermost end engaged by an upper spring saddle 32.

The spring 31 acts to apply pressure against the valve assembly and normally actuates the valve disk into seated relation with the upper surface of the valve seat. In order that the opening of the valve may be regulated, the upper part 10 of the valve casing threadedly mounts an adjusting screw 33 with its lowermost end bearing on the upper spring saddle 32. The adjusting screw is preferably provided with a head portion at its other end so that the screw may be manipulated by means of a suitable wrench or other tool. Moreover, in order that the spring may be maintained in adjusted position, the screw 33 may also be provided with a lock nut 34 for locking the same in any desired position of its adjustment.

With the foregoing construction, the valve will be normally closed by the valve biasing spring 31. However, since the diaphragm 16 is exposed on its lowermost surface to variations in the flow inlet pressure, the valve assembly may be actuated upwardly against the pressure of the biasing spring whenever the inlet pressure reaches such value as to flex the diaphragm upwardly and open the valve.

With a valve construction as thus far described, it has been found that objectionable chattering attends the opening of the valve. Such chattering has been found to result from the fact that the diaphragm 16 is located adjacent to the valve seat, so that when the valve disk is moved upwardly away from the seat, there is an immediate dropping of the pressure acting on the diaphragm as soon as the valve opens. This decrease of pressure permits the spring 31 to reclose or seat the valve. The pressure acting on the diaphragm again builds up and opens the valve with the result that the cycle of opening and closing continues and the valve vibrates or chatters.

I have discovered that this vibration or chattering may be eliminated by providing an annular groove 35 in the face of the valve seat, this groove being connected through a small bleeder passage 36 with the outlet side or low pressure side of the flow passage.

This bleeder passage positively assures the effective area on the lower surface of the valve disk, when closed, this effective area being determined by the outer peripheral margin of the valve seating surface or the diameter of the valve seat.

Grooving the seating surface of the valve seat as described above, produces a rugose surface of such a character that, during flow between the valve seat and the valve disk, the flow is slowed up at this groove and a portion of the flow is so deflected as to cause eddy currents to form. These eddy currents will be generally directed toward the lower face of the valve disk and will exert a certain amount of pressure against the valve disk which will tend to hold the valve off its seat, thus offsetting the drop in pressure against the diaphragm caused by the opening of the valve. By utilizing the above arrangement, the valve will be positively opened and chattering effectively eliminated.

While in the present instance, the groove is disclosed in the upper surface of the valve seat, it will be apparent to those skilled in the art that this groove might just as well be placed in the under surface of the valve disk, and the same purpose would be accomplished.

From the foregoing description, it will be apparent that the present invention provides an improved valve construction wherein objectionable chattering of the valve parts will be eliminated; which utilizes a rugose portion on the valve seat that acts to set up eddy currents for creating forces tending to move the valve parts to open position and compensating for decrease of the pressure acting on the valve opening diaphragm; and which provides an improved non-chattering valve of simple and inexpensive construction, that is simple in operation and positive in action.

Now, it is, of course, to be understood that although I have described in detail the preferred embodiment of my invention, the invention is not to be thus limited, but only insofar as defined by the scope and spirit of the appended claims.

I claim as my invention:

1. A valve comprising a casing having a flow passage connecting with an inlet and an outlet side thereof, an annular valve seat in the casing, a valve member normally biased toward seating position on the valve seat, a diaphragm responsive to inlet pressure and connected to the valve member for moving it toward unseated position, an annular groove in the valve seat for setting up eddy currents in response to flow thereover, said eddy currents being in such direction as to exert additional pressure on the seating side of the valve member tending to move it toward open position, and a bleeder passageway connecting said groove with said outlet side of the valve.

2. A relief valve comprising a casing having a flow passageway connecting with an inlet side and outlet side thereof, a valve seat member, a valve member, said members being supported for relative movements into seated and unseated positions, a spring normally acting to move one of the members to seated position, a diaphragm responsive to inlet pressure for moving one of the said members to unseated position, an annular groove in one of said members acting in the unseated position of said members to deflect a portion of the flow therebetween toward the other of said members for opposing movement of the members to seated position, and a passageway connecting said groove with the outlet side of said flow passageway.

3. A relief valve comprising a casing having a flow passageway connecting with an inlet side and outlet side thereof, an annular valve seat surrounding the flow passageway, a flexible diaphragm axially aligned with the valve seat, a valve member carried by the diaphragm and disposed on one side thereof for cooperative association with said seat, an adjustable spring on the other side of the diaphragm normally urging the valve member to seating position, the valve side of the diaphragm being exposed to the inlet pressure in the passageway and acting in response thereto to unseat the valve, an annular groove in the seating face of the valve seat, and a bleeder passageway connecting said groove with the outlet pressure in the flow passageway.

4. A relief valve comprising a split casing formed by joined casing portions, a flexible diaphragm anchored at its periphery between the casing portions and separating the casing into upper and lower chambers, a flow passageway through the lower chamber connected with an inlet opening and an outlet opening, an annular seat member defining a portion of said passageway, a valve member cooperatively associated with the seat member to control said passageway, said valve member being carried by and axially positioned relative to the valve seat solely by said diaphragm and the diaphragm having its lowermost surface exposed to the inlet pressure in said passageway, whereby upward deflection of the diaphragm acts to unseat the valve, an adjustable regulating spring in the upper chamber of the casing acting to flex the diaphragm downwardly and move the valve to seated position, means in the lower chamber for compensating for the decrease of inlet pressure acting on the diaphragm, when the valve member is unseated, whereby valve chatter is eliminated, and means acting in conjunction with said first means for maintaining a constant effective fluid pressure actuating area on said diaphragm.

5. A relief valve comprising a casing having a flow passageway connecting with an inlet and an outlet thereof, a valve seat member, a valve member, said members having cooperable surfaces of engagement, means supporting said members for relative movements for engaging and disengaging said surfaces, a diaphragm responsive to inlet pressure for moving one of the members to disengage said surfaces, a groove having a side opening in one of said surfaces and adapted to be closed by the other of said surfaces, when the surfaces are in engagement, said groove acting upon disengagement of the surfaces to deflect a portion of the flow therebetween towards said other of the surfaces, and a bleeder connection between said groove and the outlet side of said passageway.

ARTHUR W. BURKS.